(12) United States Patent
Ozaki et al.

(10) Patent No.: US 7,373,208 B2
(45) Date of Patent: May 13, 2008

(54) CONTROL APPARATUS AND CONTROL METHOD

(75) Inventors: Kenichi Ozaki, Nakai (JP); Taro Takahashi, Manaduru (JP); Xiaoming Jiang, Odawara (JP)

(73) Assignee: Hitachi, Ltd., Tokyo (JP)

( * ) Notice: Subject to any disclaimer, the term of this patent is extended or adjusted under 35 U.S.C. 154(b) by 433 days.

(21) Appl. No.: 11/215,034

(22) Filed: Aug. 31, 2005

(65) Prior Publication Data
US 2007/0010899 A1    Jan. 11, 2007

(30) Foreign Application Priority Data
Jul. 5, 2005    (JP) .............................. 2005-195775

(51) Int. Cl.
G05B 9/02    (2006.01)
F26B 13/00    (2006.01)
F04B 49/00    (2006.01)
(52) U.S. Cl. .............................. 700/79; 34/531; 417/22
(58) Field of Classification Search .................. 700/79; 34/531; 417/22
See application file for complete search history.

(56) References Cited

U.S. PATENT DOCUMENTS 5,651,193 A * 7/1997 Rhodes et al. ................. 34/531
6,135,718 A * 10/2000 Yang ............................ 417/22
6,563,284 B2 * 5/2003 Teutsch et al. ............. 318/599
6,665,163 B2 * 12/2003 Yanagisawa ................ 361/103

FOREIGN PATENT DOCUMENTS

JP    8-195760    7/1996

* cited by examiner

Primary Examiner—David Vincent
Assistant Examiner—Thomas Stevens
(74) Attorney, Agent, or Firm—Mattingly, Stanger, Malur & Brundidge, P.C.

(57) ABSTRACT

Each of controllers includes: a transistor; a data processor for executing predetermined data processing and turning the transistor on or off in accordance with the data processing result; a pull-up resistor connected to an output terminal of the transistor; and a level separating resistor connected to the output terminal of the transistor, and the data processor of each controller detects a signal level of a control signal output from the output terminal of the transistor and judges whether or not any defect has occurred in its own controller, based on the detection result.

16 Claims, 5 Drawing Sheets

| ROTATION INSTRUCTION SIGNAL | MICROCOMPUTER MONITOR RESULT | FAN ROTATION STATE | JUDGEMENT |
|---|---|---|---|
| Low (FAN LOW SPEED) | Low | - | OWN SYSTEM CTL MALFUNCTION |
| | High | LOW SPEED | NORMAL |
| | | HIGH SPEED | FAN MALFUNCTION |
| High (FAN HIGH SPEED) | Low | LOW SPEED | FAN MALFUNCTION |
| | | HIGH SPEED | NORMAL |
| | High | - | OWN SYSTEM CTL MULFUNCTION |

FIG.6

| JUDGMENT RESULT | LED DISPLAY |
|---|---|
| MANAGEMENT CTL #0 MALFUNCTION | LED LIT |
| MANAGEMENT CTL #1 MALFUNCTION | LED LIT |
| FAN MALFUNCTION | CORRESPONDING FAN LED LIT |

CONTROL APPARATUS AND CONTROL METHOD

CROSS-REFERENCE TO RELATED APPLICATION

This application relates to and claims priority from Japanese Patent Application No. 2005-195775, filed on Jul. 5, 2005, the entire disclosure of which is incorporated herein by reference.

BACKGROUND OF THE INVENTION

The present invention relates to a control apparatus and a control method, more particularly to a control apparatus and a control method that are suitable for application to a disk array apparatus designed to control the rotation of cooling fans based on the logical sum of control signals output from dual controllers.

In recent years, a single disk array apparatus is equipped with a plurality of cooling fans for cooling the inside of the chassis. By driving the cooling fans with low or high speed rotation, depending on the situation, heat generated from hard disk drives and various circuit boards and other components installed inside the chassis is efficiently discharged outside.

The rotation control of the cooling fans in the above-described case is conducted by using wired-OR connection to the respective output lines of the dual controllers in order to reduce the number of cables, and thereby gives a logical sum of rotation instruction signals, as control signals output from each controller (for example, a high-level signal for high-speed rotation, and a low-level signal for low-speed rotation) to the cooling fans through a single signal line.

The rotation state (rotation rate) of the cooling fans is detected by a rotation sensor installed for the fans and fed back to each of the controllers. Accordingly, each controller can detect, based on a sensor output of the rotation sensor, a rotation malfunction of the cooling fans, such as outage or low-speed rotation of the cooling fans in spite of a high-speed-rotation order from the controller.

JP Patent Laid-Open Publication No. Hei 8-195760 discloses a defect detecting system including a plurality of slave devices that are connected to each other in a multi-dropped wired-OR connection. Each slave device is equipped with: a transmission circuit for processing transmission data in a baseband into time-divided transmission data and outputting this data; a monitoring circuit for monitoring the time-divided transmission data and outputting an output blocking control signal when detecting a malfunction; and an output blocking circuit for physically blocking transmission of the time-divided transmission data input from the transmission circuit when the output blocking control signal is supplied from the monitoring circuit. Accordingly, this system can identify a defect in any of the slave devices connected to each other in the multi-dropped wired-OR connection, while minimizing any effect that the defective slave device may have on the other slave devices.

SUMMARY OF THE INVENTION

The above conventional defect detecting system for a disk array apparatus is configured in such a way that the logical sum of the rotation instruction signals output from the two controllers is supplied to the cooling fans through the single signal line, as described above. Accordingly, even if the controller can detect a rotation malfunction of the cooling fans based on the rotation sensor output, there is a problem in that it is impossible to identify which controller or cooling fan is malfunctioning.

Therefore, when a rotation malfunction occurs in the cooling fans in a conventional disk array apparatus, maintenance personnel have to inspect both controllers and respective cooling fans, and so the repair work is complicated.

As a means for solving the above-described problem, it is possible to make each controller of the disk array apparatus have the same function as the defect monitoring system disclosed in JP Patent Laid-Open Publication No. Hei 8-195760. In this way, it is possible to detect in which controller a defect has occurred, but it is still difficult to identify a specific part that is malfunctioning. Moreover, by this method, it is not possible to deal with a malfunction of the cooling fan itself. Accordingly, even if the defect monitoring system disclosed in JP Patent Laid-Open Publication No. Hei 8-195760 is applied to the controllers in this disk array apparatus, the repair work resulting from the rotation malfunction of the cooling fan is still complicated.

The present invention was made in consideration of the above-described problems. It is an object of this invention to propose a control apparatus and a control method that can facilitate the repair work.

To achieve the above object, the present invention provides a control apparatus for controlling a control target based on a wired-OR output of each control signal output from a plurality of controllers. Each of the controllers includes: a transistor provided in an output section; a data processor for executing predetermined data processing and turning the transistor on or off in accordance with the data processing result; a pull-up resistor connected to an output terminal of the transistor; a level separating resistor also connected to the output terminal of the transistor; and a signal level detector for detecting the level of the control signal output from the output terminal of the transistor, wherein the data processor judges whether or not any defect has occurred in its own controller, based on a detection result of the signal level detector.

The present invention also provides a method of controlling a control target based on a wired-OR output of each control signal output from a plurality of controllers. Each of the controllers includes: a transistor provided in an output section; a data processor for executing predetermined data processing and turning the transistor on or off in accordance with the data processing result; a pull-up resistor connected to an output terminal of the transistor; and a level separating resistor connected to the output terminal of to the transistor, wherein the data processor executes processing including: a first step of detecting the level of the control signal output from the output terminal of the transistor; and a second step of judging whether nor not any defect has occurred in its own controller, based on the detection result.

When a malfunction occurs in a control target, this invention can distinguish and easily identify which controller is malfunctioning. Therefore, the repair work for the failure can be made remarkably easier.

DESCRIPTION OF THE DRAWINGS

FIG. 5 is a chart for explaining the method of judging whether or not any defect has occurred in the resource management controllers.

FIG. 6 is a chart for explaining the method of judging whether any defect has occurred in an MPU.

DETAILED DESCRIPTION OF PREFERRED EMBODIMENTS

Figure 1:
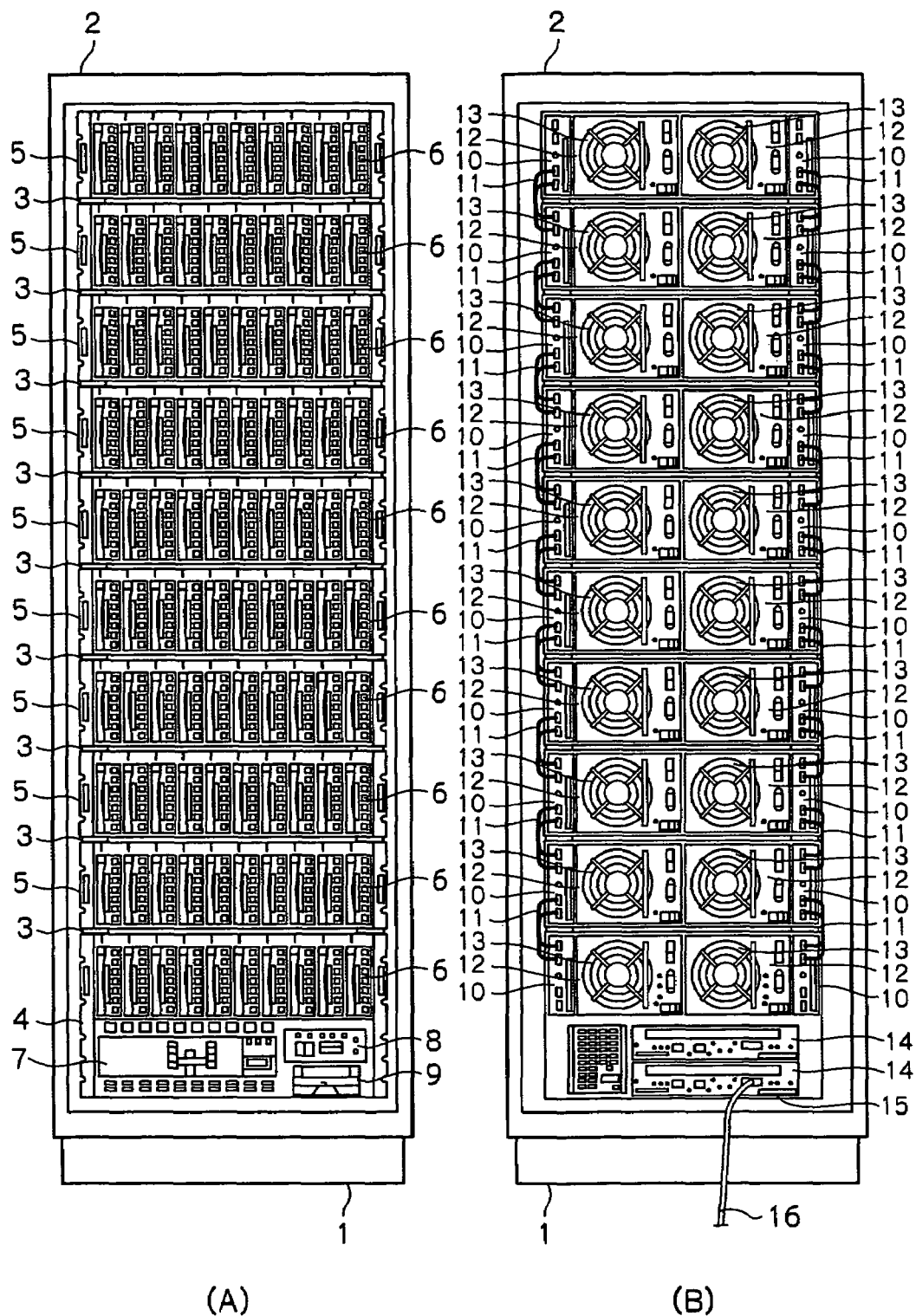
FIG. 1(A) is a front view of the external configuration of a disk array apparatus according to an embodiment of this invention.
FIG. 1(B) is its back view.

An embodiment of the present invention is hereinafter described with reference to the attached drawings.

(1) External Configuration of Disk Array Apparatus According to Embodiment

FIGS. 1(A) and 1(B) show a disk array apparatus 1 according to an embodiment of this invention. This disk array apparatus 1 is framed by a rack frame 2. Inside the rack frame 2, a plurality of mount frames 3 are placed to form shelves one above another, and a basic chassis 4 and expanded chassis 5 are mounted on the mount frames 3 in such a way that the chassis can be inserted or removed in a drawer-like manner. In this disk array apparatus 1, one basic chassis 4 is mounted on the bottom rack and a plurality of expanded chassis 5 is mounted on the upper racks.

As is clear from FIG. 1(A), a plurality of disk drive units 6, each of which contains a hard disk drive 6A (FIG. 2), is arranged in the upper front part of the basic chassis 4 in such a way that the disk drive units 6 can be freely interchanged. Disk drives based on, for example, the SCSI (Small Computer System Interface) standard, the ATA (AT Attachment) standard, or the SATA (Serial AT Attachment) are used as the hard disk drives 6A.

In the lower front part of the basic chassis 4, a battery unit 7, a display panel 8, and a flexible disk drive 9 are installed. The battery unit 7 contains a secondary battery, and functions as a backup power source for supplying electric power to the disk drive units 6, controller boards 14 described below, and so on when the power supply from an AC/DC power source is lost due to electrical power failure or other reasons. The display panel 8 is equipped with a display device for displaying the operation state of the hard disk drive 6 in each disk drive unit 6. The flexible disk drive 9 is used to load a maintenance program stored on a flexible disk.

As shown in FIG. 1(B), power source controller boards 10 are mounted, one at each of the upper back left and right of the basic chassis 4. Each power source controller board 10 is equipped with a connector (not shown) for a fibre channel cable. This connector is connected to a corresponding connector of the adjoining expanded chassis 5 via the fibre channel cable to enable communication between the chassis 4 and 5. Any two adjoining expanded chassis 5 are also connected to each other via the fibre channel cable 11 to allow communication therebetween. The fibre channel cables 11 thus form a loop communication route described below, through which the power source controller boards 10 can communicate in an FC-AL system (or topology) with the hard disk drives 6A in the respective disk drive units 6 in the basic chassis 4 and expanded chassis 5.

Also, in the upper back part of the basic chassis 4, two AC/DC power sources 12 are arranged side by side in a space between the two power source controller boards 10.

Those AC/DC power sources 12 are electrically connected to the power source controller boards 10 via a backboard (not shown), and thereby can supply electric power to the disk drives 6A in the respective disk drive units 6, various boards, and various units via the power source controller boards 10.

Cooling fans 13 are installed on the respective back sides of the AC/DC power sources 12. By rotating the cooling fans 13, it is possible to make air pass through and be discharged from the basic chassis 4. Accordingly, the disk array apparatus 1 can discharge the heat generated from the respective hard disk drives 6A, the respective AC/DC power sources 12, and so on, out of the basic chassis 4.

In the lower back part of the basic chassis 4, two controller boards 14 are installed for redundancy purposes. Each controller board 14 includes: a communication interface with the hard disk drives 6A in the disk drive units 6 mounted in the basic chassis 4 and expanded chassis 5; and a circuit for controlling the operation of the hard disk drives 6A (for example, RAID-based control) and monitoring the status of the hard disk drives 6A.

The controller board 14 also includes a circuit for controlling the cooling ability of the cooling fans 13 and controlling the display device in the display panel 8. This circuit may be included in the power source controller boards 10.

The controller board 14 has an external connector 15 based on a redetermined interface standard, such as SAN (Storage Area Network) or LAN (Local Area Network), for connection to a host system. Accordingly, by connecting a communication cable 16 to this external connector 15, the disk array apparatus 1 can communicate with the host system via this communication cable 16.

On the front side of the expanded chassis 5, a plurality of disk drive units 6 respectively containing the hard disk drives 6A is arranged as shown in FIG. 1(A). On the back side of the expanded chassis 5, the power source controller boards 10 are placed, one at both the left and right side ends as shown in FIG. 1(B), and two AC/DC power sources 12 are arranged side by side in the space between the two power source controller boards 10.

Cooling fans 13 are installed on the respective back sides of the AC/DC power sources 12. By rotating the cooling fans 13, it is possible to make air pass through and discharged from the expanded chassis 5. Accordingly, the disk array apparatus 1 can discharge the heat generated from the respective hard disk drives 6A (FIG. 2) in the respective disk drive units 6 contained in the expanded chassis 5, the AC/DC power sources 12, and so on, out of the expanded chassis 5.

(2) Internal Configuration of Disk Array Apparatus 1

Figure 2:
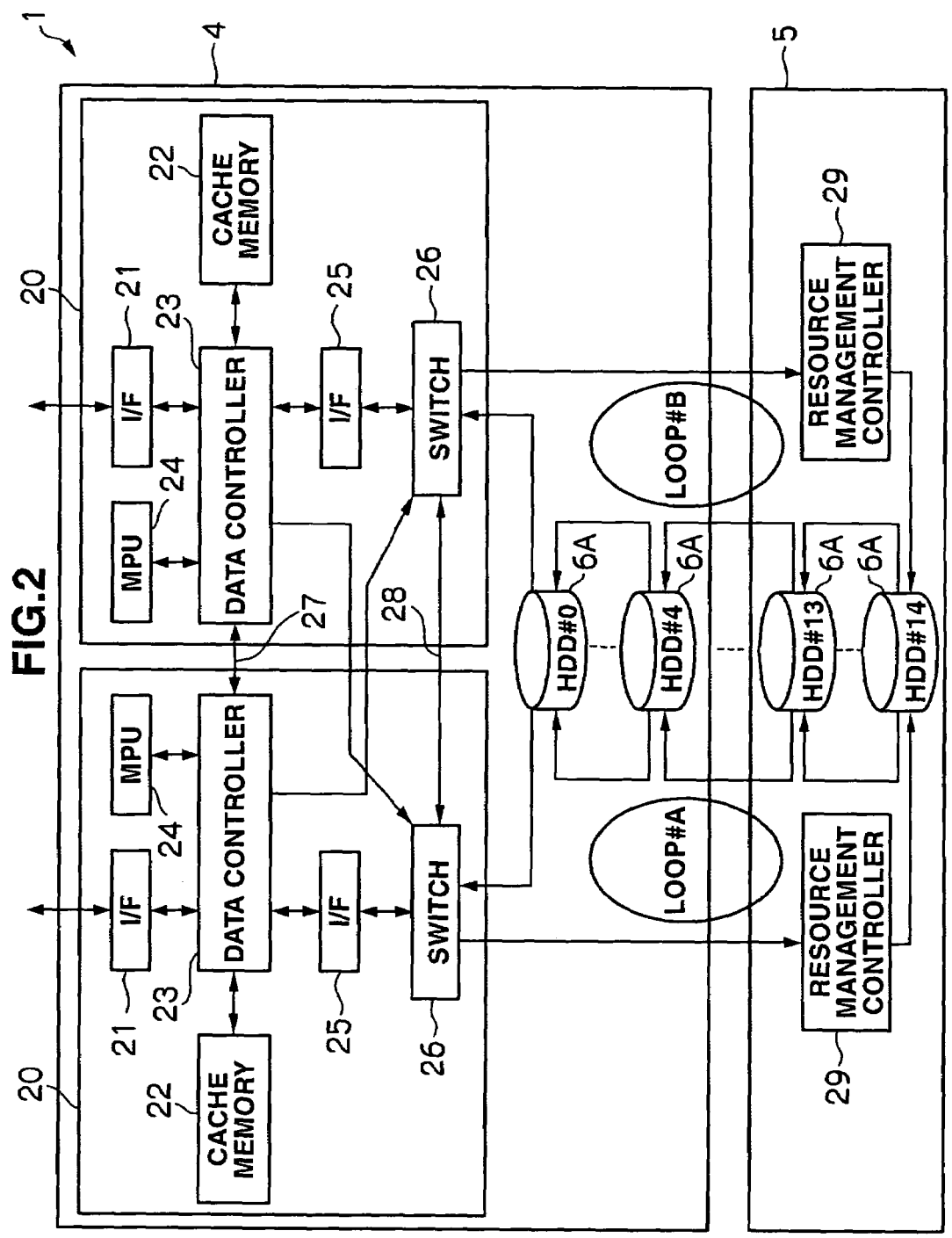
FIG. 2 is a block diagram showing the internal configuration of the disk array apparatus.

FIG. 2 shows the internal configuration of the above-described disk array apparatus 1. In this disk array apparatus 1, each of the two controller boards 14 provided for redundancy purposes in the basic chassis 4 has two main control units 20 having the same configuration.

Each main control unit 20 individually has the function of controlling the operation of the entire disk array apparatus 1. The main control unit 20 includes: a first interface 21; a cache memory 22; a data controller 23; an MPU (Micro Processing Unit) 24; a second interface 25; and a route switching unit 26.

The first interface 21 functions as a communication interface for communication with the host system. This first interface 21 converts the format of data and various commands transmitted from the host computer according to Fibre Channel Protocol into the format based on the PCI (Peripheral Component Interconnection) standard, which is used in the main control unit 20, and it converts the data and various commands in PCI format into Fibre Channel Format and transmits the converted data and commands to the host system according to Fibre Channel Protocol.

The cache memory 22 consists of, for example, a volatile memory, and is used to temporarily store data to be read from and written to the hard disk drive 6A in each disk drive unit 6 of the basic chassis 4 and the expanded chassis 5.

The data controller 23 has the function of performing data transfer processing in the main control unit 20, and transfers data under the control of the MPU 24, between the first interface 21 and the cache memory 22, between the cache memory 22 and the second interface 25, and between the cache memory 22 and the MPU 24.

The data controllers 23 in the two main controllers 20 are connected to each other via a high-speed bus 27, and exchange data between themselves via the high-speed bus 27 under the control of the MPU 24. In the disk array apparatus 1, the two main control units 20 share the same data, so data corruption can be prevented even when a defect occurs in one of the main control units 20.

Each MPU 24 controls the first and second interfaces 21 and 25, the data controller 23, and the route switching unit 26, based on various control programs stored in an internal memory (not shown), and the MPUs 24 of the two main control units 20 communicate with each other via the data controllers 23 and the high-speed bus 27, executing various processings in synchronization with each other.

The second interface 25 functions as a communication interface for communication with each expanded chassis connected via the Fibre Channel cable 11 (FIG. 1). The second interface 25 transmits data and various commands, which are handled in a data format based on the PCI standard within the main control unit 20, to the expanded chassis 5 according to Fibre Channel Protocol, and receives the data and various commands transmitted from the expanded chassis 5 according to Fibre Channel Protocol and converts those data and commands into the data format based on the PCI standard.

Each route switching unit 26 consists of a switching circuit, and is connected to the hard disk drives 6A in all the disk drive units 6 respectively mounted on the basic chassis 4 and the expanded chassis 5 via the above-described Fibre Channel cables 11 connecting the basic chassis 4 and the adjoining expanded chassis or connecting two adjoining expanded chassis, through loop communication routes (these loop communication routes are hereinafter referred to as "loop communication routes LOOP#A and LOOP#B"). In the disk array apparatus 1, even if one of the loop communication routes LOOP#A or LOOP#B is disconnected, an access to a desired hard disk drive 6A is enabled through the other loop communication route LOOP#A or LOOP#B.

The route switching unit 26 of one of the two main control units 20 is connected to the route switching unit 26 of the other main control unit 20 so as to enable communication with each other via a signal line 28, and also connected to the second interface 25 of the other main control unit 20 so as to enable communication therebetween. Because of this configuration of the disk array apparatus 1, even in the event of a defect of the route switching unit 26 of one main control unit 20, that main control unit 20 can access all the hard disk drives 6A of the basic chassis 4 and the expanded chassis 5 via the route switching unit 26 of the other main control unit 20 by switching its connection with the switching unit 26.

In each expanded chassis 5, not only a plurality of hard disk drives 6A, but also dual resource management controllers (hereinafter referred to as "resource management controllers") 29 are provided respectively on the loop communication routes LOOP#A and LOOP#B.

Each resource management controller 29 incorporates a microcomputer 34 (FIG. 3) and SRAM 33 (FIG. 3) as described below, and independently manages the rotation of each cooling fan 13 in the expanded chassis 5. For example, each resource management controller 29 constantly monitors the rotation state of each cooling fan 13 in its own expanded chassis 5, and reports any detected rotation malfunction of the cooling fan 13 to the corresponding main control unit 20 in the basic chassis 4. Also, as a result of the above report, according to a command given from the main control unit 20, the resource management controller 29 turns on a cooling fan malfunction alarm LED (not shown) that is on the power source control board 10 (FIG. 1) of its own expanded chassis 5.

Next, the flow of data input and output in the disk array apparatus 1 is described. In the disk array apparatus 1, data write/read requests transmitted from the host system are given, via the first interface 21 and then the data controller 23, to the MPU 24.

When the host system makes a data write request, the MPU 24 controls the data controller 23 to sequentially send write data from the host system, via the first interface 21 and then the data controller 23, to the cache memory 22 and store the write data in the cache memory 22. Subsequently, the MPU 24 controls the data controller 23 to read out the write data stored in the cache memory 22 and to transmit it with a write command in response to the data write request, via the second interface 25, the route switching unit 26, and then the loop communication routes LOOP#A and LOOP#B, to the corresponding hard disk drive 6A. Consequently, the write data is written at the corresponding address location in the corresponding hard disk drive 6A in the basic chassis 4 or the expanded chassis 5 in accordance with the write request.

When a data read request is given, the MPU 24 generates a corresponding read command and transmits this command, via the data controller 23, the second interface 25, the route switching unit 26, and then the loop communication routes LOOP#A and LOOP#B, to the corresponding hard disk drive 6A. As a result, the MPU 24 reads out the read data from the corresponding hard disk drive 6A based on this read command, sends the read data sequentially, via the loop communication routes LOOP#A and LOOP#B, the route switching unit 26, the second interface 25, and then the data controller 23, to the cache memory 22 and stores the read data in the cache memory 22. Subsequently, the read data stored in the cache memory 22 is read out by the controller 23 from the cache memory 22, and transmitted, via the first interface 21, to the corresponding host system under the control of the MPU 24.

(3) Detailed Configuration of Resource Management Controller 29

Figure 3:
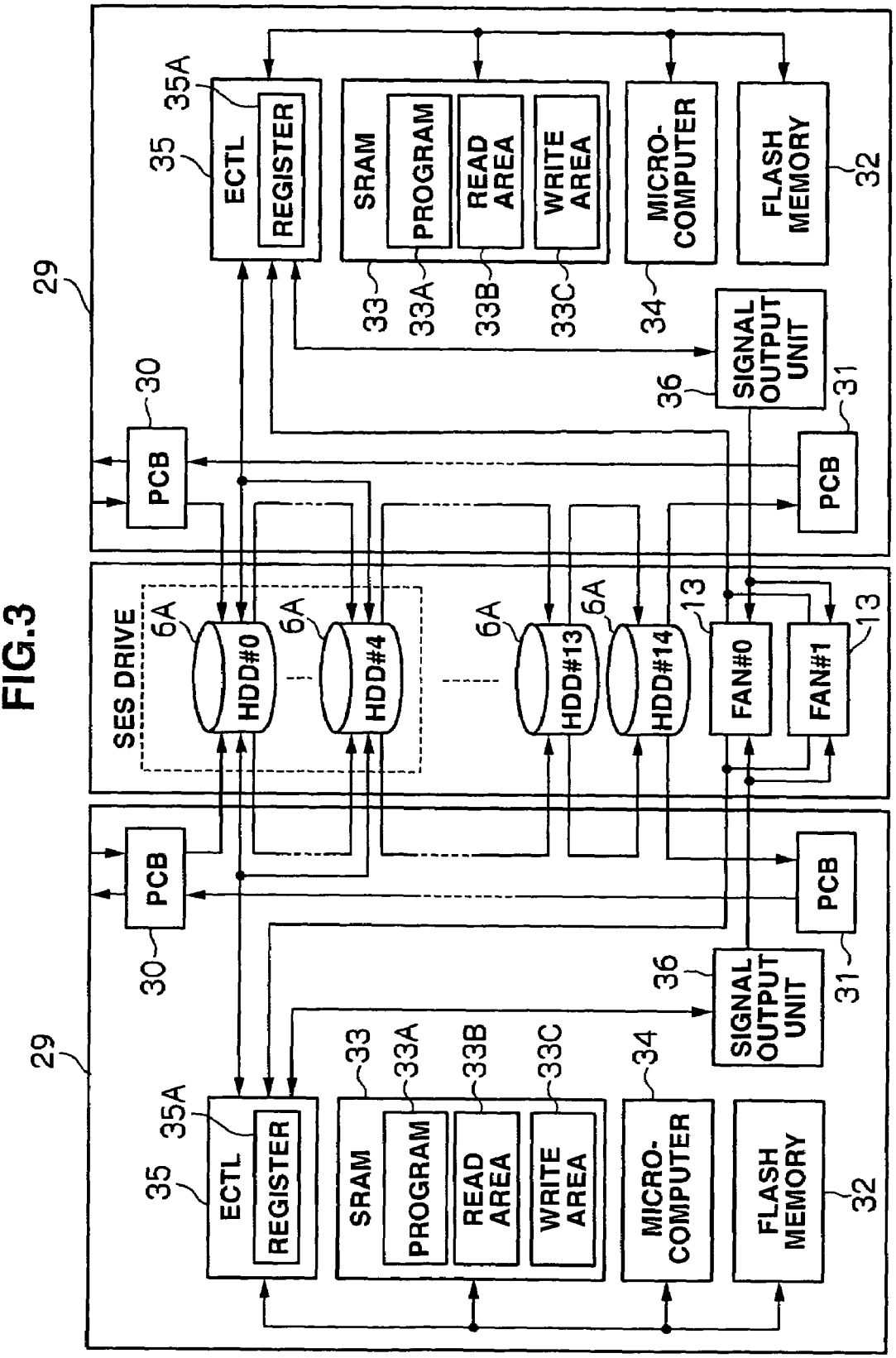
FIG. 3 is a block diagram showing the configuration of resource management controllers.

FIG. 3 shows the detailed configuration of the above-mentioned resource management controllers 29 provided in the respective expanded chassis 5. As is clear from FIG. 3, each resource management controller 29 includes first and second route switching units 30 and 31; a flash memory 32;

SRAM (Static Random Access Memory) 33; a microcomputer 34; an enclosure controller 35; and a signal output unit 36.

The first and second route switching units 30 and 31 are composed of switching circuits, and switch the connection state to close or open the loop communication routes (LOOP#A and LOOP#B) described above in reference to FIG. 2, under the control of the microcomputer 34. For example, in order to connect its own expanded chassis 5 to the adjoining expanded chassis 5, the second route switching unit 31 switches the connection to open the loop communication routes. On the other hand, in order not to connect its own expanded chassis 5 to the adjoining expanded chassis 5, the second route switching unit 31 switches the connection state to close the loop communication routes.

The flash memory 32 is used mainly to maintain various control programs. The SRAM 33 is used as work memory for the microcomputer 34. When the microcomputer 34 operates, a program operation area 33A, a read area 33B, and a write area 33C are allocated in the SRAM 33. In the program operation area 33A, a control program read out from the flash memory 32 by the microcomputer 34 is expanded. In the read area 33B, resource management information that indicates, for example, whether or not any defect has occurred in its own resource management controller 29 or the cooling fan 13, is stored. In the write are 33C, various setting information, including the rotation rate of the cooling fans 13 set by the MPU 24 (FIG. 2) of the main control unit 20 (FIG. 2), is stored.

Figure 4:
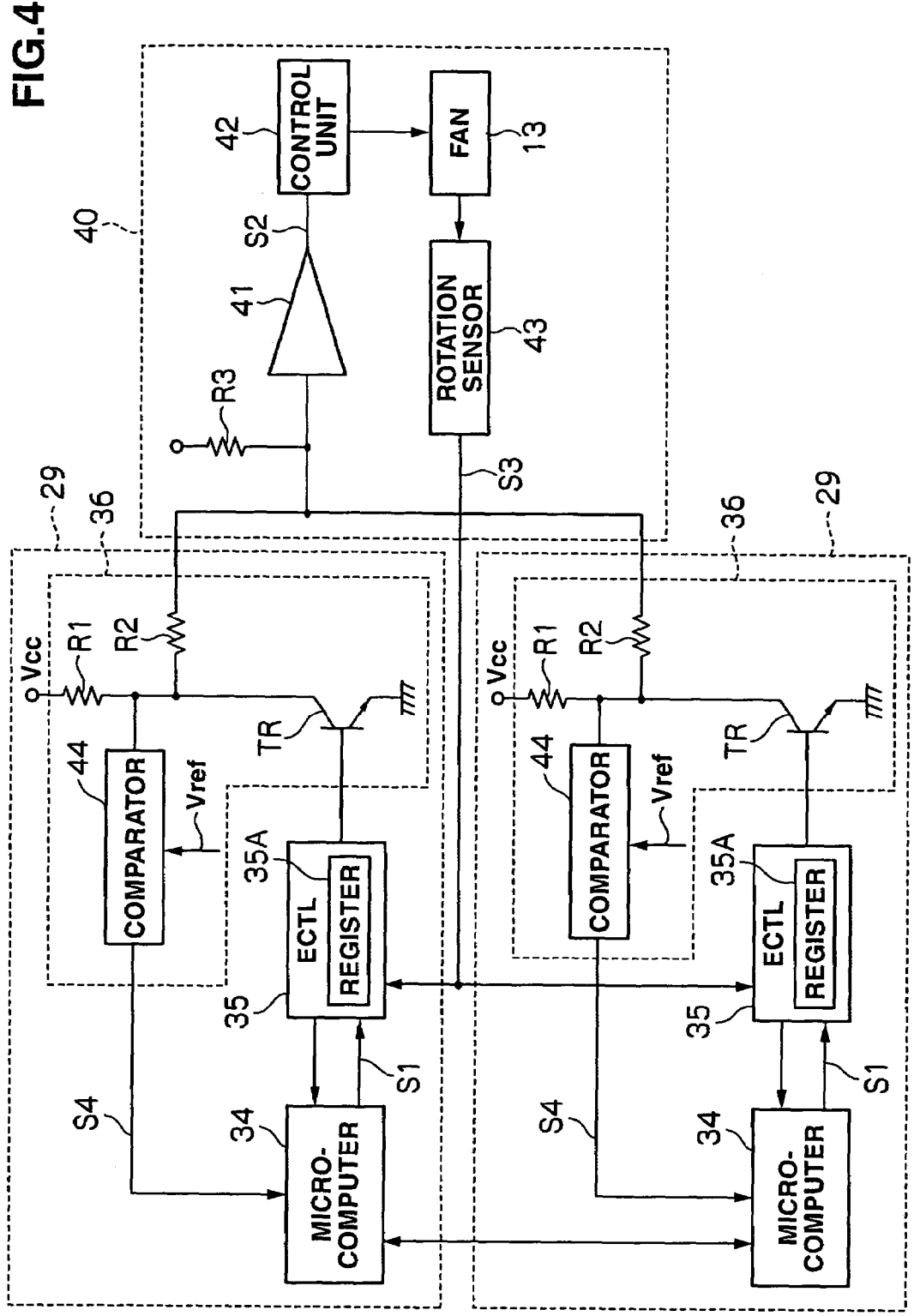
FIG. 4 is a block diagram showing the specific configuration of a signal output unit.

The microcomputer 34 executes various control processing, such as rotation control for each cooling fan 13 installed in its own expanded chassis 5, according to a control program expanded in the program area 33A of the SRAM 33. In practice, the microcomputer 34 controls the rotation of the cooling fans 13 at a low or high speed according to the control program and the output of a temperature sensor (not shown) provided in its own expanded chassis 5. As shown in FIG. 4, the microcomputer 34 is connected to the microcomputer 34 of the other resource management controller 29 via a signal line to enable communication with each other, and controls the cooling fans 13 in synchronization with the microcomputer 34 of the other resource management controller 29 while communicating therebetween.

The enclosure controller 35 includes a register 35A for temporarily storing various information that is transmitted and received between the microcomputer 34 and hardware such as the cooling fans 13 and the hard disk drives 6A, and performs various control processing so that the microcomputer 34 and the corresponding hardware exchange various information via the register 35A.

The signal output unit 36 is provided in an output section of the resource management controller 29, and performs output processing for transmitting a signal based on a rotation instruction signal output from the microcomputer 34 to the cooling fans 13, as described below. The signal output unit 36 also detects whether the output signal from the signal output unit 36 based on the rotation instruction signal is at a high level (low-speed rotation instruction) or at a low level (high-speed rotation instruction), and reports the result to the microcomputer 34.

FIG. 4 shows the detailed configuration of the signal output unit 36. As shown in FIG. 4, each signal output unit 36 is equipped with an NPN open collector transistor TR. In this transistor TR, an emitter is grounded and an output terminal collector is connected, via a pull-up resistor R1, to a power source Vcc.

The collectors of the transistors TR are connected to each other in wired-OR connection on a backplane 40 via a level separating resistor R2, pulled up by a pull-up resistor R3 connected to the power source Vcc, and then connected to a control unit 42 for controlling the rotation of the cooling fans 13 via a buffer 41 formed on the backplane 40.

The collector of the transistor TR is also connected to a comparator 44, and the output of this comparator 44 is supplied to the microcomputer 34. The microcomputer 34 is also connected to a base of the transistor TR via the enclosure controller 35.

Next, a technique for managing the cooling fans 13 in the resource management controller 29 having the above-described hardware configuration is described with reference to FIGS. 3 to 6.

In the resource management controller 29, the microcomputer 34 usually controls the rotation (low-speed or high-speed rotation) of each cooling fan 13 installed in its own expanded chassis 5 according to: the internal temperature of its own expanded chassis 5 as reported from a temperature sensor (not shown) installed in the expanded chassis 5; the control program that is read out from the flash memory 32 (FIG. 3) at start-up and expanded in the program area 33A (FIG. 3) in SRAM 33 (FIG. 3); and the rotation malfunction information of the cooling fans 13 as obtained in the manner described below.

For example, to make the cooling fans 13 rotate at a low speed, the microcomputer 34 outputs a low-level (Low) rotation instruction signal S1. The rotation instruction signal S1 specifying the low-speed rotation is supplied, via the register 35A of the enclosure controller 35, to the base of the transistor TR in the signal output unit 36.

As a result, in the signal output unit 36, the transistor TR is turned off and the collector voltage of the transistor TR thereby becomes high (High). This collector voltage is connected in wired-OR connection, on the backboard 40, to the collector voltage of the transistor TR of the signal output unit 36 of the other resource management controller 29. At this moment, the collector voltage of the transistor TR in the signal output unit 36 of the other resource management controller 29 also becomes high by the same process.

A logical sum signal S2 formed by the logical sum of the collector voltages of the two transistors TR that are wired-OR connected is then supplied, via the buffer 41, to the control unit 42 formed on the backboard 40. The control unit 42 then controls each cooling fan 13 in the expanded chassis 5, to make them rotate at a predetermined first rotation rate that is preset as the low rotation speed in accordance with the logical sum signal S2.

On the other hand, to make the cooling fans 13 rotate at a high speed, the microcomputer 34 outputs a high-level rotation instruction signal S1. This rotation instruction signal S1 specifying the high-speed rotation is supplied, via the register 35A in the enclosure controller 35, to the base of the transistor TR of the signal output unit 36.

As a result, in the signal output unit 36 the transistor TR is turned on and the collector voltage of the transistor TR thereby becomes low. This collector voltage is connected in the wired-OR connection to the collector voltage of the other transistor TR on the backboard 40. At this moment, the collector voltage of the transistor TR in the signal output unit 36 in the other resource management controller 29 also becomes low by the same processing. Consequently, a logical sum signal S2 formed by a logical sum of the collector voltages of the two transistors TR connected in the wired-OR connection is supplied to the control unit 42 via the buffer 41. The control unit 42 controls the cooling fans 13 in the expanded chassis 5, to make them rotate at a predetermined second rotation rate that is preset as the high rotation speed in accordance with the logical sum signal S2.

At this moment, a rotation sensor 43 integrally installed with the cooling fan 13 detects the operation state (rotation) of each cooling fan 13, and provides that as a rotation state detection signal S3 to the enclosure controller 35 in each resource management controller 29. The enclosure controller 35 checks the rotation rate of each cooling fan 13 at regular time intervals according to the rotation detection signal S3, and stores the detection result in the register 35A in this enclosure controller 35.

Meanwhile, the comparator 44 is provided with a predetermined voltage as a reference voltage $V_{REF}$ that is preset to be higher than the collector voltage (Low) when the transistor TR is turned on, and to be lower than the collector voltage (High) when the transistor TR is turned off. The comparator 44 constantly compares the reference voltage $V_{REF}$ with the collector voltage and outputs the comparison results as a comparison signal S4 to the microcomputer 34.

The microcomputer 34 judges whether or not any malfunction is occurring in its own resource management controller 29 and the cooling fans 13 according to a resource information acquisition command transmitted from the MPU 24 (FIG. 2) in the main control unit 20 (FIG. 2) in the basic chassis 4 (FIG. 2).

Namely, to acquire resource management information such as the presence of a rotation malfunction in the cooling fans 13, the MPU 24 in the main control unit 20 transmits a resource information acquisition command to acquire the resource information to a hard disk drive 6A called an "SES drive" in each expanded chassis 5 shown in FIG. 3, according to Fibre Channel Protocol at regular time intervals (for example, every two seconds).

The SES drive is a hard disk drive capable of reading and writing resource management information. In the example of FIG. 3, the hard disk drives 6A shown as "HDD#00" to "HDD#04" are SES drives. When receiving the resource information command, the SES drive reports the reception of the command to the microcomputer 34 via the enclosure controller 35.

The microcomputer 34 reads out a control program for resource management (hereinafter referred to as "resource management program") from the flash memory 32 soon after the power is turned on, and runs the resource management program so that the resource management program is expanded in the program operation area 33A in the SRAM 33. When the microcomputer 34 is informed of the reception of the resource management acquisition command from any of the SES drives after the program has been activated, it judges whether or not a malfunction has occurred in its own resource management controller 29 or the cooling fans 13 (that is, whether or not any defect has occurred in its own resource management controller 29 or the cooling fans 13), based on the comparison signal S4 supplied from the comparator 44 and the rotation rate of each cooling fan 13 stored in the register 35A in the enclosure controller 35, in accordance with the judgment criterion shown in FIG. 5.

For example, when the microcomputer 34 outputs the low-level rotation instruction signal S1, it is expected that the collector voltage of the transistor TR will be high. However, if a short mode (short circuit) defect has occurred in the transistor TR at this moment, the collector voltage of this transistor TR is at a lower ground level than the reference voltage $V_{REF}$ of the comparator 44, and therefore the collector voltage of the transistor TR recognized by the microcomputer 34 based on the comparison signal S4 is low.

In this manner, the microcomputer 34 judges whether a defect has occurred in its own system (faulty).

At this moment, in the other resource management controller 29, the collector voltage of the transistor TR does not become ground level because of the level separating resistor R2. Since the reference voltage $V_{REF}$ of the comparator 44 is set lower than the collector voltage in this state, the collector voltage of the transistor TR recognized by the microcomputer 34 based on the comparison signal S4 is high. In this manner, the microcomputer 34 judges that its own system is normal (not faulty).

If the microcomputers 34 in both resource management controllers 29 output high-level rotation instruction signals S1, it is expected that the collector voltages of the both transistors TR are will be low.

If an open mode (disconnection) defect, by which the collector voltage become high impedance, has occurred in the transistor TR in one of the resource management controllers 29, the collector voltage of the transistor TR in the other resource management controller 29 becomes ground level lower than the reference voltage $V_{REF}$ of the comparator 44 because this transistor TR is turned on, and the collector voltage recognized by the microcomputer 34 based on the comparison signal S4 becomes low. In this manner, the microcomputer 34 judges that its own system is normal (not faulty).

On the other hand, in the resource management controller 29 in which a defect has occurred in the transistor TR, the collector voltage does not become ground level because of the level separating resistor R2, but becomes a higher level than the reference voltage $V_{REF}$ of the comparator 44. Accordingly, the collector voltage of the transistor TR recognized by the microcomputer 34 based on the comparison signal S4 becomes high. In this manner, the microcomputer 34 judges whether a malfunction has occurred in its own system (faulty).

Moreover, when the microcomputer 34 outputs a low-level (high-speed) rotation instruction signal S1, if the rotation rate of any of the cooling fans as stored in the register 35A in the enclosure controller 35 is a low-speed rotation rate even though the collector voltage of the transistor TR recognized based on the comparison signal S4 supplied from the comparator 44 to the microcomputer 34 is high, the microcomputer 34 judges that there is a malfunction in that cooling fan 13 (a defect has occurred in that cooling fan 13).

The microcomputer 34 exchanges the thus-obtained judgment result on whether or not any defect has occurred in its own resource management controller 29 or the cooling fans 13 with the other microcomputer 34 to share the information, and stores this judgment result in the read area 33B of the SRAM 33.

Consequently, the judgment result is read out from the read area 33B of SRAM 33, sent via the enclosure controller 35 to the SES drive, and stored as the resource management information in the SES drive. This resource management information stored in the SES drive is then read out and supplied to the MPU 24 in the main control unit 20 in the basic chassis 4.

Based on this resource management information, the MPU 24 judges whether or not a defect has occurred in the resource management controller 29 or each cooling fan 13 in any of the expanded chassis 5. Also, when a defect is detected in the resource management controller 29 or cooling fan 13 in any of the expanded chassis 5 according to the above judgment, the MPU 24 identifies the defect location and, according to the identification result, transmits setting information indicating that an alert LED provided to the resource management controller 29 or the cooling fan 13 should be turned on, to the SES drive in the corresponding expanded chassis 5, and stores the information in the SES drive, as shown in FIG. 6. When the MPU 24 judges that a rotation malfunction has occurred in any of cooling fans 13 (the cooling fan 13 is faulty), the MPU 24 stops the rotation of this cooling fan 13, transmits the setting information indicating that other cooling fans 13 should be rotated at higher speed, to the SES drive in the corresponding expanded chassis 5, and stores the information in the SES drive.

The SES drive, having received the above setting information, accesses the microcomputer 34 via the enclosure controller 35 and reports the reception of the setting information to the microcomputer 34. When receiving this report, the microcomputer 34 reads out the setting information from the SES drive via the enclosure controller 35 and writes the setting information in the write area 33C of the SRAM 33.

The microcomputer 34 also writes the setting information, which is written in the write area 33C in the SRAM 33, in the register 35A in the enclosure controller 35. The enclosure controller 35 turns on an alert LED on the corresponding display panel from among the display panels (not shown) provided on the power source controller board 10 (FIG. 1) corresponding to each resource management controller 29 and those (not shown) provided on each cooling fan 13, based on the setting information written in the register 35A. When the setting information indicating high-speed rotation of the cooling fans 13 is written to the register 35A, the enclosure controller 35 makes the cooling fans 13 rotate at high speed by transmitting this setting information to the corresponding cooling fans 13.

In this manner, the disk array apparatus 1 deals with rotation malfunction in the cooling fans 13.

A resource management controller in a conventional disk array apparatus is configured in such a way that a section corresponding to the signal output unit 36 of the disk array apparatus 1 does not have the pull-up resistor R1, the level separating resistor R2, and the comparator 44 that are included in the signal output unit 36 according to the present invention. Accordingly, when rotation malfunction has occurred in cooling fan 13 in the conventional disk array apparatus, even though the occurrence of the rotation malfunction can be recognized, it is impossible to identify in which resource management controller 29 the defect has occurred.

On the contrary, in the disk array apparatus 1, the resource management controller 29 in each expanded chassis 5 detects the signal level of the rotation instruction signal S1 output from its own signal output unit 36 and judges whether or not a defect has occurred in its own resource management controller 29 (particularly in the transistor TR), based on the detection result. Also, the resource management controller 29 judges whether a defect has occurred in any of the cooling fans 13 based on the rotation rate of each cooling fan 13 as stored in the register 35A in the enclosure controller 35 according to the rotation detection signal S3 from the rotation sensor 43 that is integrally installed with each cooling fan 13. Accordingly, it is possible to easily identify the defective location even when a rotation malfunction has occurred in the cooling fans 13, and to make easy the repair work for the rotation malfunction.

Moreover, when a defect has occurred in the enclosure controller 35 or the transistor TR in the signal output unit 36 in each resource management controller 29, the disk array apparatus 1 can identify which enclosure controller 35 or transistor TR is faulty, by measuring the output signal level of the enclosure controller 35 and of the transistor TR. Therefore, it is possible to further facilitate the repair work for the rotation malfunction of the cooling fans 13.

(4) Other Embodiments

The above embodiment describes the case where the dual resource management controllers 29 are contained in the expanded chassis 5. However, this invention is not limited to such a configuration, and can be applied to a case where there are triple or multiple resource management controllers 29 (namely, three or more resource management controllers 29 provided in each expanded chassis 5).

Also, the above embodiment describes the case where the control target is the cooling fans 13. However, without limitation to such a case, the present invention can be applied to a wide range of control apparatuses for controlling control targets, based on a wired-OR output of each control signal output from a plurality of controllers.

Moreover, the above embodiment describes the case where the comparator 44 is used as the signal level detector for detecting the collector voltage level as the control signal that is output from the collector that is the output terminal of the transistor TR. However, without limitation to such usage, this invention can widely employ various other means.

Furthermore, the above embodiment describes the case where an alert LED is lit as the means of reporting the identified defective location to a user or a maintenance personnel after identifying the defective location (the resource management controllers 29 or the cooling fans 13). However, this invention is not limited to just that application, and it is also possible to notify a management server, via a network or the like, of the identified defective location and display it on the management server, or to record a history of defective locations.

The present invention is applicable not only to a disk array apparatus, but also to various apparatuses having a control apparatus for controlling a control target based on a wired-OR output of each control signal output from a plurality of controllers.

We claim:

1. A control apparatus for controlling a control target based on a wired-OR output of each control signal output from a plurality of controllers, each of the controllers comprising:
   a transistor provided in an output section;
   a data processor for executing predetermined data processing and turning the transistor on or off in accordance with the data processing result;
   a pull-up resistor connected to an output terminal of the transistor;
   a level separating resistor also connected to the output terminal of the transistor; and
   a signal level detector for detecting the level of the control signal output from the output terminal of the transistor,
   wherein the data processor judges whether or not any defect has occurred in its own controller, based on the detection result of the signal level detector.

2. The control apparatus according to claim 1, further comprising a sensor for detecting what operation state the control target is in,
   wherein the data processor judges whether or not any defect has occurred in the control target, based on the outputs of the sensor and the signal level detector.

3. The control apparatus according to claim 1, wherein the data processor is connected to the data processor in other controller so as to enable communication between those data processors, and the data processor controls its control target in synchronization with the other data processor, while communicating with the other data processors.

4. The control apparatus according to claim 1, wherein the data processor is connected to the data processor in other controllers so as to enable communication between the data processors, and exchanges the result of the judgment on whether or not any defect has occurred in its controller with the other data processors.

5. The control apparatus according to claim 4, further comprising a processor for obtaining the result of judgment on whether or not any defect has occurred in its own controller, from the data processor of each controller, and identifying the malfunctioning controller based on the result of the judgment.

6. The control apparatus according to claim 5, further comprising a display unit for displaying the result of the identification by the processor.

7. The control apparatus according to claim 5, further comprising a sensor for detecting what operation state the control target is in,
wherein the data processor judges whether or not any defect has occurred in the control target, based on the outputs of the sensor and the signal level detector, and
wherein the processor obtains the result of the judgment on whether or not any defect has occurred in the control target, from the data processor in each controller, and identifies the controller and/or the malfunctioning control target.

8. The control apparatus according to claim 7, further comprising a display unit for displaying the result of the identification by the processor.

9. A method for controlling a control target based on a wired-OR output of control signal output from a plurality of controllers, each of the controllers comprising:
a transistor provided in an output section;
a data processor for executing predetermined data processing and turning the transistor on or off in accordance with the data processing result;
a pull-up resistor connected to an output terminal of the transistor; and
a level separating resistor also connected to the output terminal of the transistor, and
wherein the data processor executes processing including:
a first step of detecting the level of the control signal output from the output terminal of the transistor; and
a second step of judging whether or not any defect has occurred in its own controller based on the detection result.

10. The control method according to claim 9, wherein in the first step a sensor detects what operation state the control target is in; and in the second step, whether or not any defect has occurred in the control target or not is judged based on the outputs of the sensor and the signal level detector.

11. The control method according to claim 9, wherein the data processor is connected to the data processor of other controllers so as to enable communication between the data processors, and controls the control target in synchronization with the other data processor while communicating with the other data processors.

12. The control method according to claim 9, wherein the data processor is connected to the data processor of other controllers so as to enable communication between the data processors,
and wherein the processing executed by the data processor further includes a third step of exchanging, between the data processors, the result of the judgment on whether or not any defect has occurred in its own controller.

13. The control method according to claim 12, wherein a processor executes processing including a fourth step of obtaining the result of judgment on whether or not any defect has occurred in its own controller, from the data processor of each controller, and identifying the malfunctioning controller based on the result of the judgment.

14. The control method according to claim 13, further including a fifth step of displaying the result of the identification by the processor.

15. The control method according to claim 13, further comprising a sensor for detecting what operation state the control target is in,
wherein in the second step the data processor judges whether or not any defect has occurred in the control target, based on the outputs of the sensor and the signal level detector, and
wherein in the third step the processor obtains the result of the judgment on whether or not any defect has occurred in the control target, from the data processor of each controller, and identifies the controller and/or the malfunctioning control target based on the result of the judgment.

16. A control method according to claim 15, further comprising a fifth step of displaying the result of the identification by the processor.

* * * * *